US008571590B2

(12) United States Patent
Hong

(10) Patent No.: US 8,571,590 B2

(45) Date of Patent: Oct. 29, 2013

(54) MOBILE TERMINAL THAT DISPLAYS OBTAINED BROADCAST SERVICE IDENTITY INFORMATION WHEN BROADCAST SERVICE GUIDE IS NOT AVAILABLE AND METHOD OF CONTROLLING MOBILE TERMINAL

(75) Inventor: Seok Min Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 13/010,718

(22) Filed: Jan. 20, 2011

(65) Prior Publication Data

US 2011/0207442 A1 Aug. 25, 2011

(30) Foreign Application Priority Data

Feb. 19, 2010 (KR) ........................ 10-2010-0015326

(51) Int. Cl.
*H04B 7/00* (2006.01)

(52) U.S. Cl.
USPC ........ 455/515; 455/414; 455/509; 455/550.1; 370/350; 370/335; 348/569; 348/732

(58) Field of Classification Search
USPC ............ 455/414, 515, 414.1, 550.1; 709/202; 348/569, 732; 370/350, 335, 338, 328, 370/339, 342, 343, 347, 373, 374, 395.4
See application file for complete search history.

(56) References Cited

U.S. PATENT DOCUMENTS

| | | | | |
|---|---|---|---|---|
| 2008/0196067 | A1 * | 8/2008 | Ryu | 725/62 |
| 2009/0005118 | A1 * | 1/2009 | Kim et al. | 455/558 |

FOREIGN PATENT DOCUMENTS

| | | |
|---|---|---|
| CN | 101132527 | 2/2008 |
| CN | 101283532 | 10/2008 |
| CN | 101335950 | 12/2008 |

OTHER PUBLICATIONS

The State Intellectual Property Office of the People's Republic of China Application Serial No. 201110033571 1 Office Action dated Apr. 28, 2013, 8 pages.

* cited by examiner

*Primary Examiner* — Patrick Edouard
*Assistant Examiner* — Fred Casca
(74) *Attorney, Agent, or Firm* — Lee, Hong, Degerman, Kang & Waimey

(57) ABSTRACT

A mobile terminal and controlling method thereof are disclosed, which facilitates a terminal to be used in further consideration of user's convenience. According to at least one of embodiments of the present invention, the present invention includes receiving a transport stream from a broadcasting network, accessing a mobile communication network or a the broadcasting network to receive a broadcast service guide, if a broadcast service guide is receivable, receiving and displaying the broadcast service guide, and if the broadcast service guide is not receivable, extracting broadcast control information from the transport stream, obtaining broadcast service identity information on a broadcast service provided by the broadcasting network from the extracted broadcast control information, and then displaying the obtained broadcast service identity information.

8 Claims, 17 Drawing Sheets

FIG. 8

| Syntax | Length(bit) | Identifier |
|---|---|---|
| Network Information Table () | | |
| { | | |
| Table identifier number | 8 | uimsbf |
| Sequence number for NIT update | 4 | bslbf |
| Reserved | 4 | bslbf |
| System time | 40 | bslbf |
| Country code | 24 | uimsbf |
| Network level | 4 | bslbf |
| Network number | 12 | bslbf |
| Length of network name | 8 | uimsbf |
| for (i = 0; i < N; i++) | | |
| { | | |
| character | 8 | uimsbf |
| { | | |
| Frequency point number | 8 | bslbf |
| Center frequency | 32 | bslbf |
| Bandwidth | 4 | bslbf |
| Quantity of other frequency points used by the network | 4 | bslbf |
| for (i = 0; i < N1; i++) | | |
| { | | |
| Frequency point number | 8 | uimsbf |
| Center frequency | 32 | bslbf |
| Bandwidth | 4 | bslbf |
| Reserved | 4 | bslbf |
| { | | |
| Quantity of neighboring networks | 4 | bslbf |
| Reserved | 4 | bslbf |
| for (i = 0; i < N2; i++) | | |
| { | | |
| Level of neighboring network | 4 | bslbf |
| Neighboring network number | 12 | bslbf |
| Frequency point number of basic carrier frequency of neighboring network | 8 | bslbf |
| Center frequency | 32 | bslbf |
| Bandwidth | 4 | bslbf |
| Reserved | 4 | bslbf |
| } | | |
| CRC_32 | 32 | uimsbf |
| } | | |

FIG. 9

| Syntax | Length(bit) | Identifier |
|---|---|---|
| Multiplex configuration table ( ) | | |
| { | | |
| Table identifier number | 8 | uimsbf |
| Frequency point number | 8 | bslbf |
| Sequence number for multiplex configuration table update | 4 | bslbf |
| Reserved | 6 | bslbf |
| Quantity of multiplex frames | 6 | bslbf |
| for (i = 0; i < N; i++) | | |
| { | | |
| Identifier of multiplex frame | 6 | bslbf |
| RS Code Rate | 2 | bslbf |
| Mode of byte interleaving | 2 | bslbf |
| LDPC Code Rate | 2 | bslbf |
| Mode of modulation | 2 | bslbf |
| Reserved | 1 | bslbf |
| Mode of scrambling | 3 | bslbf |
| Quantity of time slots | 6 | bslbf |
| for (j = 0; j < M1; j++) | | |
| { | | |
| Time slot number | 6 | bslbf |
| Reserved | 2 | bslbf |
| } | | |
| Reserved | 4 | bslbf |
| Quantity of multiplex sub-frames | 4 | bslbf |
| for (j = 0; j < M2; j++) | | |
| { | | |
| Multiplex sub-frame number | 4 | bslbf |
| Reserved | 4 | bslbf |
| Service identifier | 16 | uimsbf |
| } | | |
| } | | |
| CRC_32 | 32 | uimsbf |
| } | | |

FIG. 10

| Syntax | Length(bit) | Identifier |
|---|---|---|
| Service configuration table ( ) | | |
| { | | |
| Table identifier number | 8 | uimsbf |
| Length of section | 16 | uimsbf |
| Section number | 8 | uimsbf |
| Quantity of sections | 8 | uimsbf |
| Sequence number for service configuration table update | 4 | bslbf |
| Reserved | 4 | bslbf |
| Quantity of services | 16 | uimsbf |
| for (i = 0; i < N1; i++) | | |
| { | | |
| Service identifier | 16 | uimsbf |
| Frequency point number | 8 | bslbf |
| } | | |
| CRC_32 | 32 | uimsbf |
| } | | |

FIG. 13

| Descriptor | Tag Value | Allowed in Loop | | |
|---|---|---|---|---|
| | | Platform | Target | Operational |
| reserved | 0x00 | | | |
| target_smartcard_descriptor | 0x06 | | | |
| target_MAC_address_descriptor | 0x07 | | * | |
| target_serial_number_descriptor | 0x08 | | * | |
| target_IP_address_descriptor | 0x09 | | * | |
| target_IPv6_address_descriptor | 0x0A | | * | |
| IP/MAC_platform_name_descriptor | 0x0C | | * | |
| IP/MAC_platform_provider_name_descriptor | 0x0D | * | | |
| target_MAC_address_range_descriptor | 0x0E | * | | |
| target_IP_slash_descriptor | 0x0F | | * | |
| target_IP_source_slash_descriptor | 0x10 | | * | |
| target_IPv6_slash_descriptor | 0x11 | | * | |
| target_IPv6_source_slash_descriptor | 0x12 | | * | |
| IP/MAC_stream_location_descriptor | 0x13 | | * | |
| ISP_access_mode_descriptor | 0x14 | * | | * |
| telephone_descriptor | 0x57 | * | | * |
| private_data_specifier_descriptor | 0x5F | * | | * |
| user private | 0x80 to 0xFE | * | * | * |
| reserved | 0xFF | | | |

FIG. 15

| Range | Type |
|---|---|
| 0x0000 ~ 0x003F | Reserved |
| 0x0040 ~ 0x00FF | ESG Date information |
| 0x0100 ~ 0x01FF | Reserved |
| 0x0200 ~ 0x3FFF | Continuous Service |
| 0x4000 ~ 0x7FFF | Short-time Service |
| 0x8000 ~ 0xFFFF | Reserved |

A/V service
Audio Only service

Data service
VOD
Stock service
Etc.

(16-2) (16-2) (16-3)

MOBILE TERMINAL THAT DISPLAYS OBTAINED BROADCAST SERVICE IDENTITY INFORMATION WHEN BROADCAST SERVICE GUIDE IS NOT AVAILABLE AND METHOD OF CONTROLLING MOBILE TERMINAL

Pursuant to 35 U.S.C. §119(a), this application claims the benefit of earlier filing date and right of priority to Korean Application No. 10-2010-0015326, filed on Feb. 19, 2010, the contents of which is hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry. There are ongoing efforts to support and increase the functionality of mobile terminals. Such efforts include software and hardware improvements, as well as changes and improvements in the structural components which form the mobile terminal.

Recently, as mentioned in the foregoing description, various mobile terminals capable of broadcast reception are ongoing to be introduced. According to a specific broadcasting standard, after completion of a preceding reception of such broadcast related information as EPG (electronic program guide), ESG (electronic service guide) and the like, only if a user selects a desired broadcast via the received broadcast related information, the mobile terminal may be able to receive and play the selected broadcast. Yet, in case that the mobile terminal is unable to receive the broadcast related information, it is impossible for a terminal user to select a desired broadcast via the broadcast related information. Therefore, it may cause a problem that a broadcast receiving function of the mobile terminal becomes useless.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. By the present invention, even if the mobile terminal is unable to receive broadcast related information on a broadcasting network in case of attempting to receive a broadcast from the broadcast network of a specific broadcasting specification, information on broadcast services provided by the broadcast network can be provided to a terminal user. And, the provided broadcast services are selected and received by a terminal user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a broadcast receiving unit configured to receive a transport stream from a broadcasting network, a display unit configured to display a broadcast image, a mobile communication unit configured to access a mobile communication network, and a controller configured to, if a broadcast service guide is receivable via the broadcasting network or the mobile communication network, receive and display the broadcast service guide, wherein the controller is further configured to, if the broadcast service guide is not receivable, extract broadcast control information from the transport stream, obtain broadcast service identity information on a broadcast service provided by the broadcasting network from the extracted broadcast control information, display the obtained broadcast service identity information.

In another aspect of the present invention, a method of controlling a mobile terminal according to the present invention includes: receiving a transport stream from a broadcasting network, accessing a mobile communication network or a the broadcasting network to receive a broadcast service guide, if a broadcast service guide is receivable, receiving and displaying the broadcast service guide, and if the broadcast service guide is not receivable, extracting broadcast control information from the transport stream, obtaining broadcast service identity information on a broadcast service provided by the broadcasting network from the extracted broadcast control information, and then displaying the obtained broadcast service identity information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 8, FIG. 9, FIG. 10 and FIG. 11 are diagrams of broadcast control information included in a broadcast transport stream by a mobile terminal controlling method according to an embodiment of the present invention;

FIG. 13 and FIG. 14 are diagrams of broadcast control information included in a broadcast transport stream by a mobile terminal controlling method according to an embodiment of the present invention;

FIG. 15 is a table of a service ID type in a mobile terminal controlling method according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
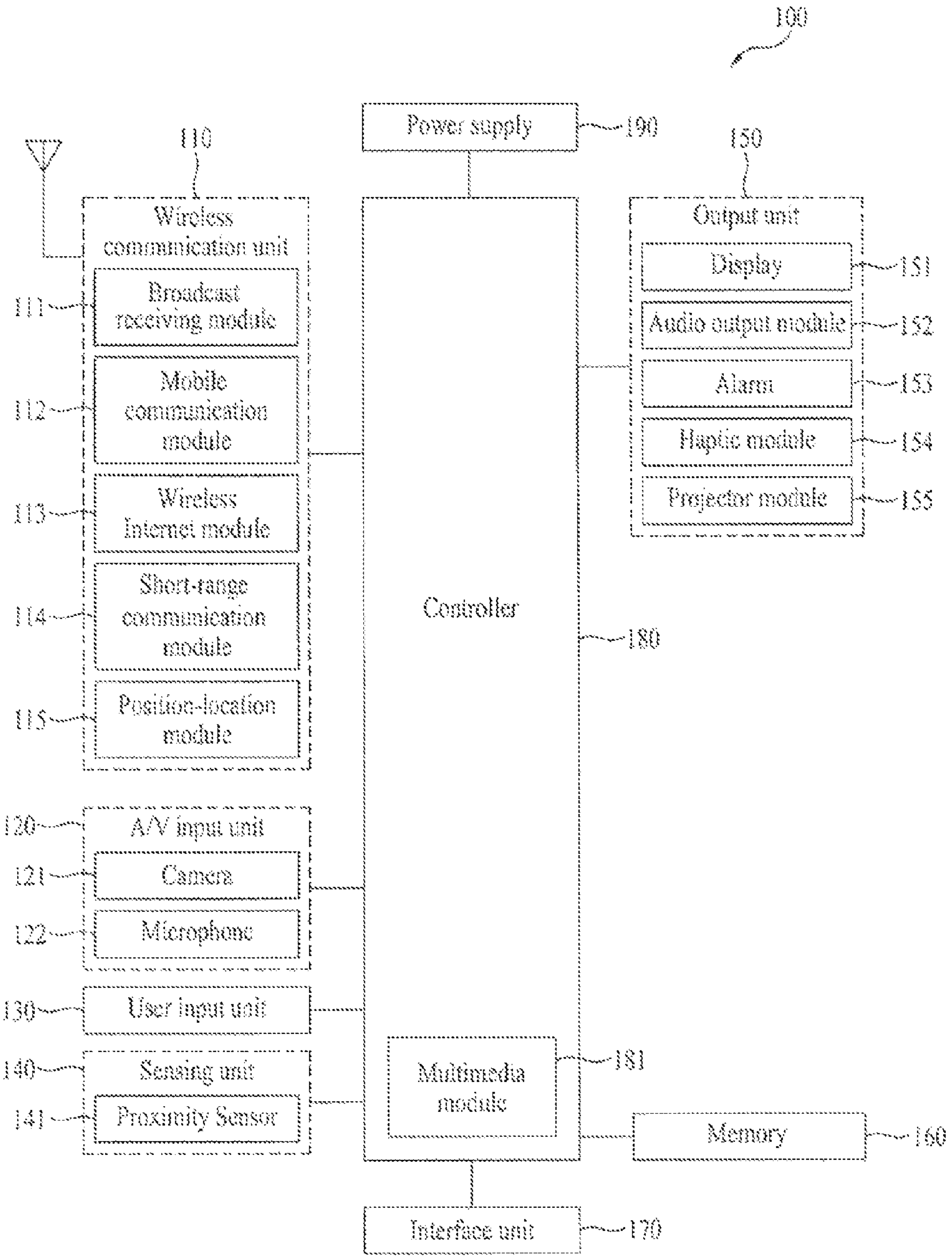
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. The broadcast associated information may be referred to as a "broadcast service guide" in this specification. The broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS (Convergence of Broadcasting and Mobile Service), OMA-BCAST (Open Mobile Alliance-BroadCAST), media forward link only (MediaFLO®), CMMB (China Multimedia Mobile Broadcasting), MBBMS (Mobile Broadcasting Business Management System), and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile communication network such as (but not limited to) GSM (Global System for Mobile communications), CDMA (Code Division Multiple Access), and WCDMA (Wideband CDMA). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include (but not limited to) WLAN (Wireless LAN) (Wi-Fi), Wibro (Wireless broadband), Wimax (World Interoperability for Microwave Access), HSDPA (High Speed Downlink Packet Access) GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
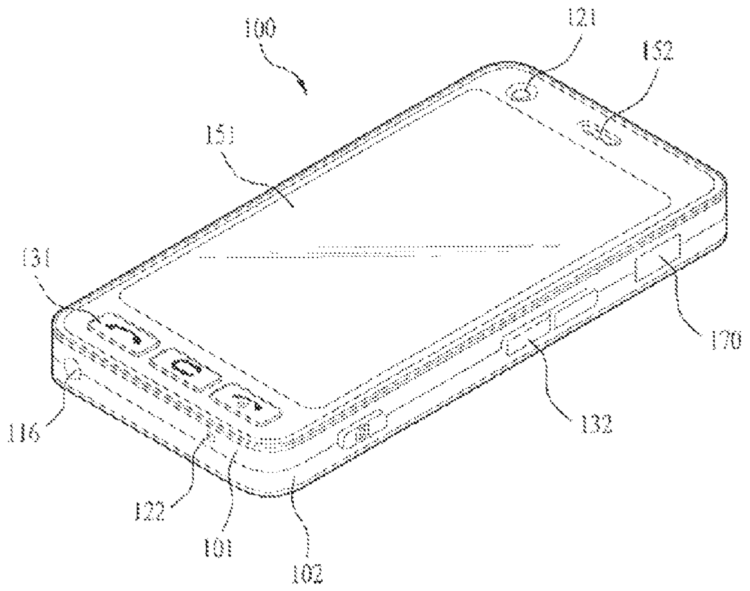
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
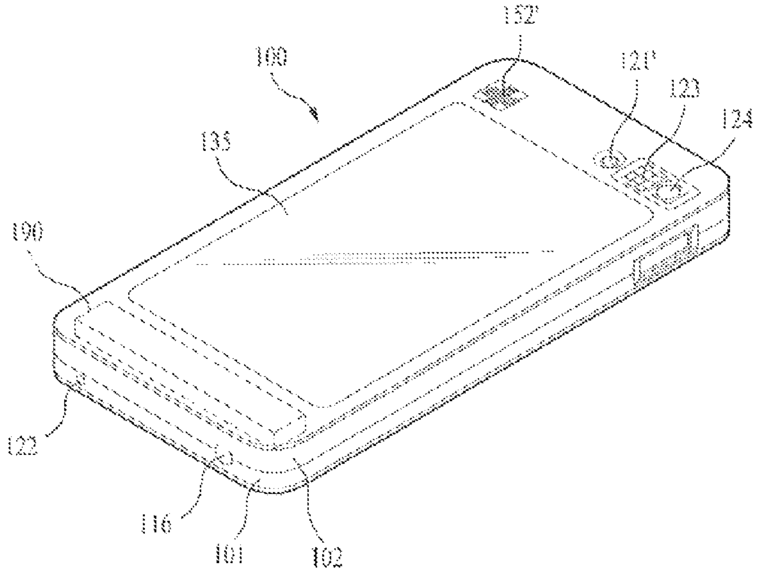
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a controlling method, which can be implemented in the mobile terminal 100, are explained with reference to the accompanying drawings. And, it is understood that the following embodiments can be implemented individually or in a manner of being combined with one another.

In the following embodiment, the display module 151 can include a touchscreen. Yet, even if the display unit 151 does not include a touchscreen, it is understood that the following embodiments can be sufficiently implemented by a manipulation of the user input unit 140. And, a display screen of the touchscreen 151 shall be indicated by a reference number 400 in the following description.

A wireless environment for implementing a mobile terminal and controlling method thereof according to embodiments of the present invention is schematically described with reference to FIG. 3 and FIG. 4 as follows.

Figure 3:
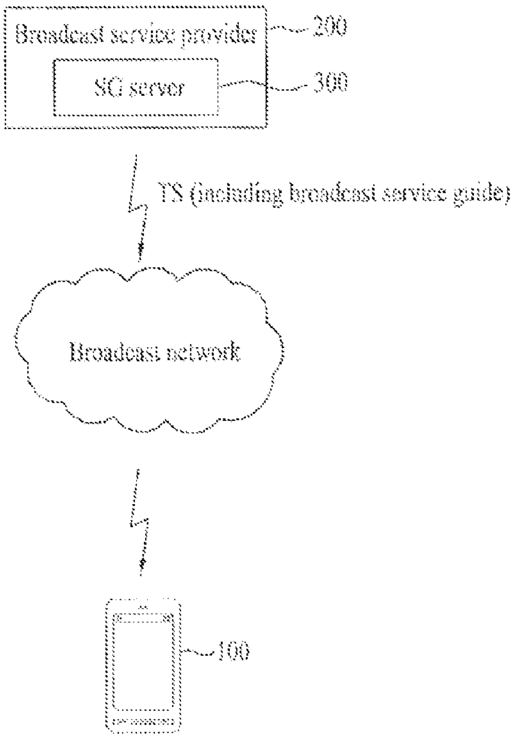
FIG. 3 and FIG. 4 are diagrams of a wireless environment for implementing a mobile terminal and controlling method thereof according to an embodiment of the present invention.
Figure 4:
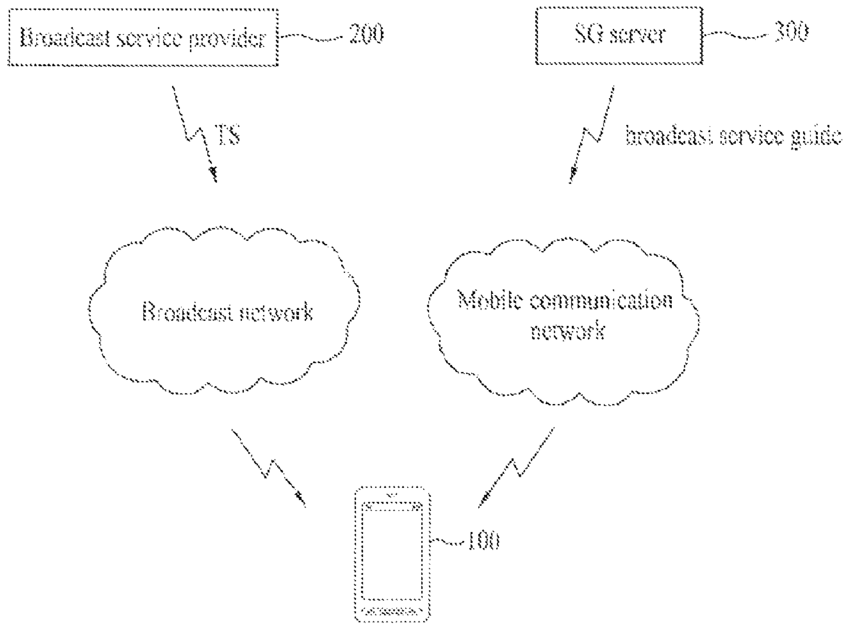

FIG. 3 and FIG. 4 are schematic diagrams of a wireless environment for implementing a mobile terminal and controlling method thereof according to an embodiment of the present invention.

Referring to FIG. 3, a broadcast service provider 200 transmits a broadcast transport stream (TS) on a specific broadcast frequency via a broadcasting network.

When the broadcast service provider 200 transmits the transport stream, a broadcast service guide provided by a broadcast service guide (SG) server 300 is multiplexed to be transmitted together with the broadcast transport stream. FIG. 3 shows that the broadcast guide server 300 is included within the broadcast service provider 200, by which the present invention is non-limited. Alternatively, the broadcast service guide server 300 is located from the broadcast service provider 200 to exist separately.

The mobile terminal 100 receives the transport stream, extracts the broadcast service guide from the transport stream, and is then able to use the extracted broadcast service guide. The extracted broadcast service guide may be automatically displayed if the mobile terminal 100 enters a broadcast receiving mode or a terminal user makes a corresponding request. If so, the terminal user selects a desired broadcast service via the broadcast service guide and is then able to view the selected broadcast service.

In the wireless environment shown in FIG. 3, the mobile terminal receives the broadcast service guide via the broadcasting network. Such wireless environment can be configured if the broadcasting network follows the broadcast specification of CMMB, DVB-CBMS, OMA-BCAST and the like for example, by which the present invention is non-limited.

Besides, the mobile terminal is able to receive the broadcast service guide via a mobile communication network as well as the broadcasting network. This is further explained with reference to FIG. 4.

Referring to FIG. 4, a broadcast service provider 200 transmits a transport stream on a specific broadcast frequency via a broadcasting network. And, a broadcast service guide server 300 provides a broadcast service guide via a mobile communication network. FIG. 4 shows that the broadcast service guide server 300 separately exists in a manner of being separated from the broadcast service provider 200, by which the present embodiment is non-limited. Alternatively, the broadcast service guide server 300 can be located in the broadcast service provider 200.

The mobile terminal 100 receives the broadcast service guide via the mobile communication network and then displays the received broadcast service guide. A terminal user is able to select a desired broadcast service via the broadcast service guide. If so, the mobile terminal 100 receives the transport stream via the broadcasting network and is then able to play the desired broadcast service.

In the wireless environment, the mobile terminal receives the broadcast service guide via the mobile communication network. Such wireless environment can be configured if the broadcasting network follows such a broadcast specification as MBBMSB, OMA-BCAST and the like, by which the present embodiment is non-limited.

If the broadcast service guide is provided via the broadcasting network, as shown in FIG. 3, the broadcast service guide may not be provided to the mobile terminal due to a problem of the broadcast service guide server or a problem of the multiplexing process despite that the transport stream is provided to the mobile terminal via the broadcasting network.

If the broadcast service guide is provided via the mobile communication network, as shown in FIG. 4, the broadcast service guide may not be provided to the mobile terminal due to an error of the broadcast service guide server or a problem of the mobile communication network despite that the transport stream is provided to the mobile terminal via the broadcasting network.

Thus, in case that the mobile terminal is unable to receive the broadcast service guide, a method for receiving to play a desired broadcast service of a terminal user is explained with reference to FIGS. 5 to 15 as follows.

Figure 5:
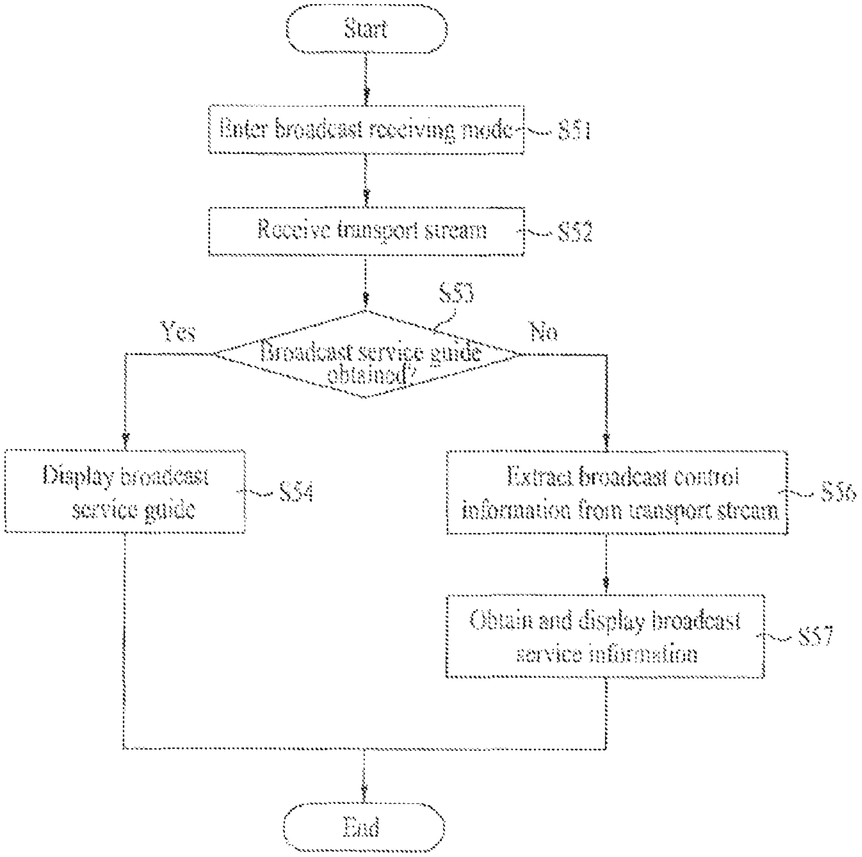
FIG. 5 and FIG. 6 are flowcharts for methods of controlling a mobile terminal according to an embodiment of the present invention, respectively.
Figure 6:
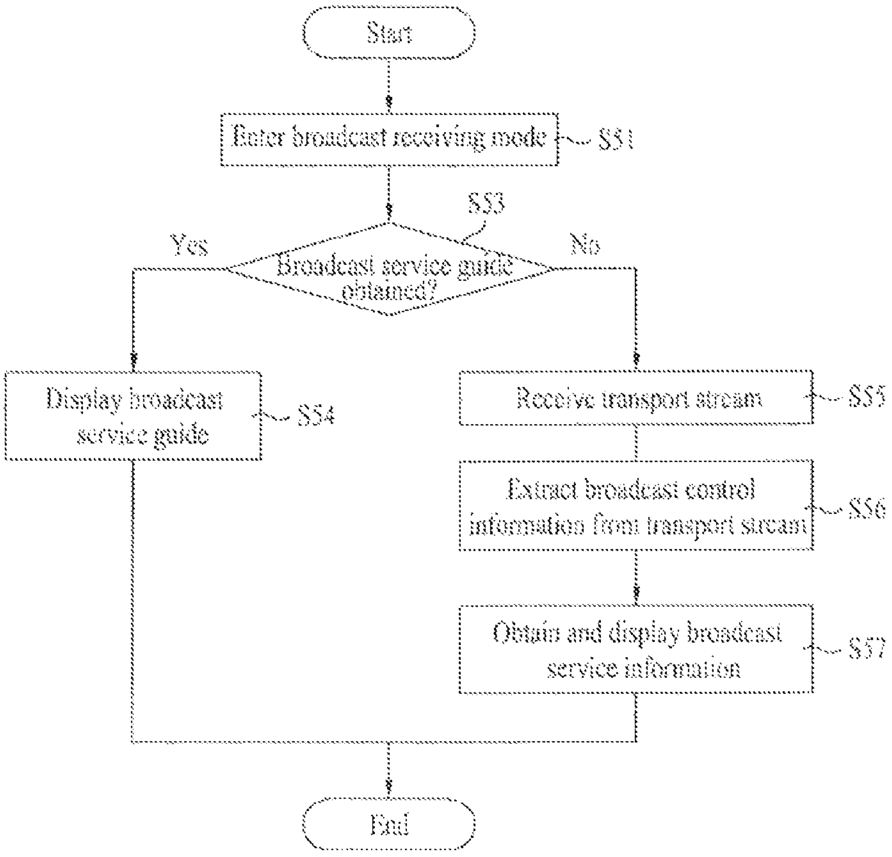
Figure 7:
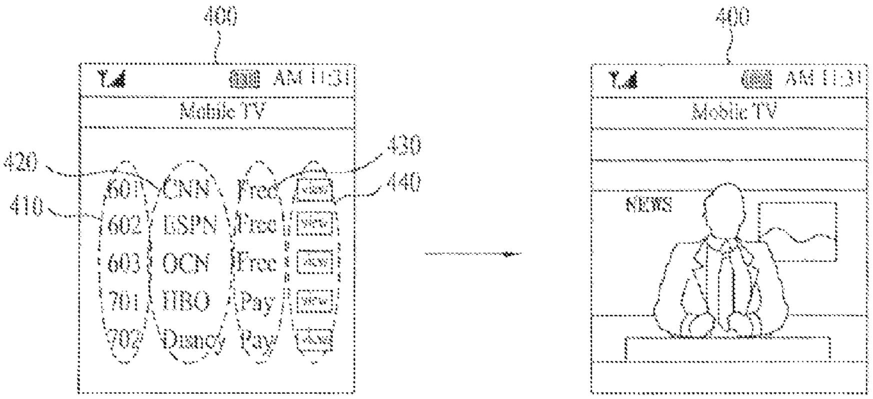
FIG. 7 illustrates diagrams of display screen configurations for implementing a mobile terminal controlling method according to an embodiment of the present invention.
Figure 11:
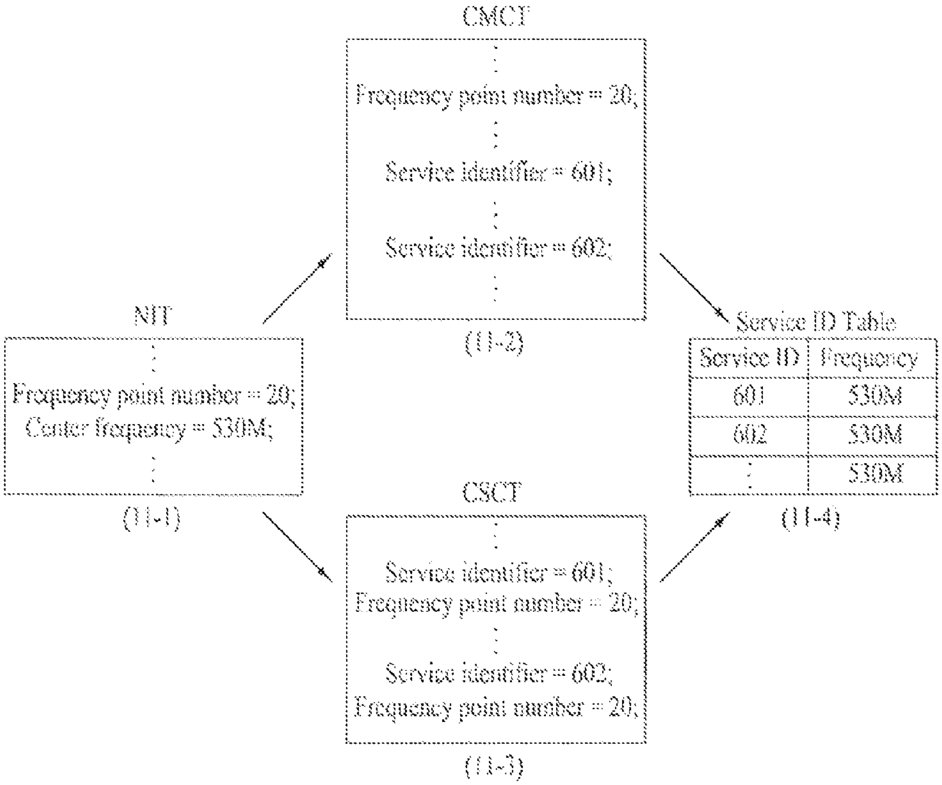
Figure 12:
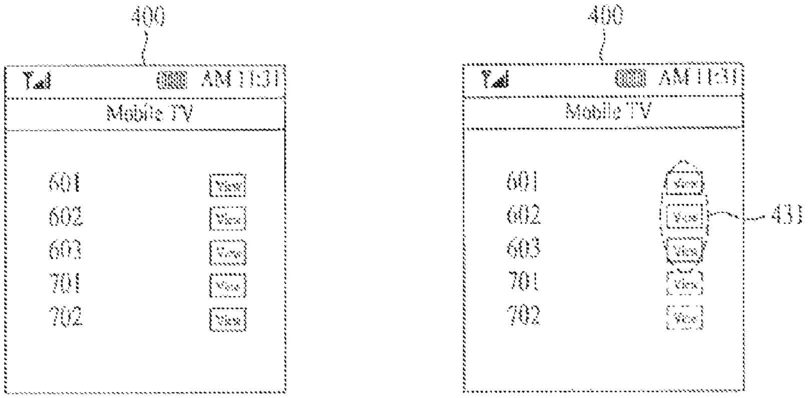
FIG. 12 illustrates diagrams of display screen configurations for implementing a mobile terminal controlling method according to an embodiment of the present invention.
Figure 16:
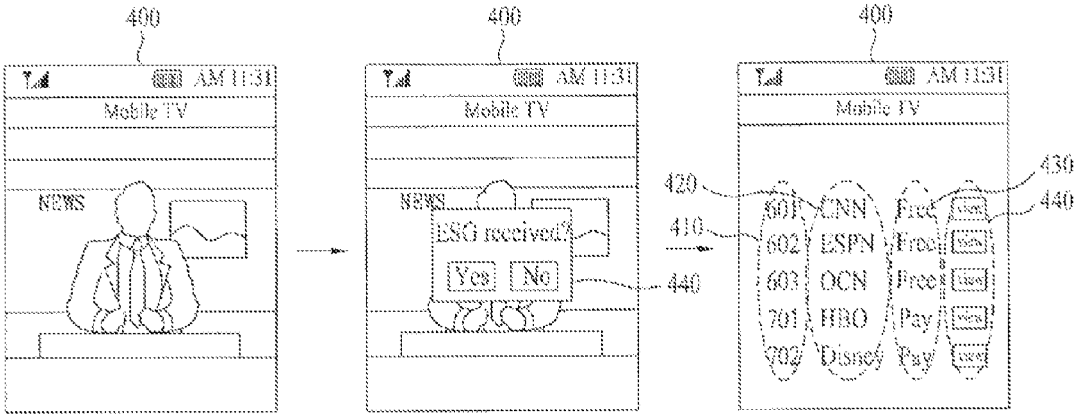
FIG. 16 illustrates diagrams of display screen configurations for implementing a mobile terminal controlling method according to an embodiment of the present invention.

FIG. 5 and FIG. 6 are flowcharts for methods of controlling a mobile terminal according to an embodiment of the present invention, respectively, FIG. 7, FIG. 12 and FIG. 16 are diagrams of display screen configurations for implementing a mobile terminal controlling method according to an embodiment of the present invention, and FIGS. 8 to 11, FIG. 13 and FIG. 14 are diagrams of broadcast control information included in a broadcast transport stream by a mobile terminal controlling method according to an embodiment of the present invention. Moreover, FIG. 15 is a table of a service ID type in a mobile terminal controlling method according to an embodiment of the present invention.

First of all, as mentioned in the foregoing description with reference to FIG. 3, a case for the mobile terminal 100 to receive the broadcast service guide via the broadcasting network is explained as follows.

First of all, the mobile terminal 100 enters a broadcast receiving mode for broadcast reception according to a terminal user command [S51]. It is apparent to those skilled in the art that the broadcast receiving mode entry can be performed by an appropriate manipulation of the user input unit 130. And, detailed description of the broadcast receiving mode entry is omitted from the following description for clarity of this disclosure.

After the broadcast receiving mode has been entered, the broadcast receiving module 111 of the mobile terminal 100 scans prescribed broadcast frequency band, is tuned to one broadcast frequency, and then receives the transport stream on the tuned broadcast frequency [S52]. In this case, the tuned broadcast frequency may be a pre-defined specific broadcast frequency or a random one of at least one or more broadcast frequencies within the broadcast frequency band.

Subsequently, the controller 180 determines whether the broadcast service guide can be obtained from the transport stream [S53].

As a result of the determination, if the broadcast service guide can be obtained, referring to FIG. 7 (7-1), the controller 180 controls the broadcast service guide to be displayed on the display screen 400 [S54].

FIG. 7 (7-1) exemplarily shows that the broadcast service guide displayed on the display screen 400 provides an ID (identifier) 410, name 420 and price information 430 of at least one broadcast service that can be received by the mobile terminal, by which the present embodiment is non-limited. Alternatively, information (e.g., a title of a currently broadcasted program, a viewable age thereof, etc.) more or less than the information shown in FIG. 7 (7-1) can be provided.

For instance, if a desired broadcast service is selected via a selection icon 440 arranged to correspond to each of the at least one or more broadcast services, referring to FIG. 7 (7-2), the selected broadcast service is received and played by the mobile terminal 100 so that a corresponding broadcast image can be displayed on the display screen 400. In case that the display unit 151 includes a touchscreen, a corresponding broadcast service can be selected by touching the selection icon.

Yet, as a result of the determination, if it is unable to obtain the broadcast service guide, the controller 180 extracts broadcast control information from the transport stream [S56].

The controller 180 is then able to obtain minimum broadcast service identity information, which enables the mobile terminal 100 to receive a broadcast service provided via the broadcasting network, from the extracted broadcast control information. The obtained broadcast service identity information can be displayed on the display screen 400 to enable a terminal user to select a prescribed broadcast service [S57].

Meanwhile, the steps S56 and S57 (more particularly, the broadcast control information and the broadcast service identity information) shall be explained in detail later.

In the following description, as mentioned in the foregoing description with reference to FIG. 4, explained is the case that the mobile terminal 100 receives the broadcast service guide via the mobile communication network.

First of all, the mobile terminal 100 enters the broadcast receiving mode according to a terminal user command [S51]. As mentioned in the foregoing description, the broadcast receiving mode entry can be performed by an appropriate manipulation of the user input unit 130.

The controller 180 accesses the mobile communication network via the mobile communication module 113 and then determines whether the broadcast service guide can be obtained [S53].

As a result of the determination, if the broadcast service guide can be obtained, referring to FIG. 7 (7-1), the controller 180 controls the broadcast service guide to be obtained and displayed on the display screen 400 [S54].

Yet, as a result of the determination, if it is unable to obtain the broadcast service guide, the broadcast receiving module 111 of the mobile terminal 100 scans prescribed broadcast frequency band, is tuned to one broadcast frequency, and then receives the transport stream on the tuned broadcast frequency [S55]. In this case, the tuned broadcast frequency may be a random one of at least one or more broadcast frequencies within the broadcast frequency band. That is, the broadcast receiving module 111 keeps scanning a prescribed broadcast frequency band until being tuned to the random broadcast frequency.

Afterwards, the controller 180 extracts broadcast control information from the transport stream [S56].

The controller 180 is then able to obtain minimum broadcast service identity information, which enables the mobile terminal 100 to receive a broadcast service provided via the broadcasting network, from the extracted broadcast control information. The obtained broadcast service identity information is displayed on the display screen 400 to enable a terminal user to select a desired broadcast service [S57].

In the following description, the steps S56 and S57 (more particularly, the broadcast control information and the broadcast service identity information) are explained in detail with reference to FIGS. 8 to 13.

The broadcast control information is the information for receiving a broadcast raw data signal transmitted via the broadcasting network. The broadcast control information and the broadcast service guide can be distinguished from each other in a following manner. First of all, the broadcast service guide includes information not for receiving the broadcast raw data but for enabling the received broadcast raw data signal to be played back in the display screen.

According to a broadcasting specification, the broadcast control information can play the same role but may have a different configuration (or type). In the following description, the broadcast control information according to the MBBMS broadcasting specification is explained.

First of all, the broadcast control information according to the MBBMS broadcasting specification can include network configuration information (e.g., NIT (network information table)), multiplex configuration information (e.g., CMCT (continual service multiplex configuration table)), and carrier frequency information (e.g., CSCT (continual service configuration table)).

The NIT is explained with reference to FIG. 8 as follows.

Referring to FIG. 8, the NIT includes information on a broadcast frequency used by the broadcasting network and information on a broadcast frequency used by a neighboring broadcasting network. Therefore, in the NIT, a frequency point number of each broadcast frequency used by the broadcasting network and a corresponding center frequency are recorded as the broadcast frequency information used by the broadcasting network.

The CMCT is explained with reference to FIG. 9 as follows.

Referring to FIG. 9, since the CMCT is used to describe information on a service multiplex frame configuration and includes information on a service ID (identifier) corresponding to each pointer number of the NIT.

The CSCT is explained with reference to FIG. 10 as follows.

Referring to FIG. 10, the CSCT is provide to describe coincidence relation information between all services and frequency carriers and also includes information on the service ID (identifier) corresponding to each point number of the NIT like the CMCT.

Therefore, if both of the NIT and the CMCT or both of the NIT and the CSCT are used together, it is able to obtain the minimum broadcast service identity information for receiving and playing the broadcast service provided by the broadcasting network. This is further explained with reference to FIG. 11 as follows.

FIG. 11 exemplarily shows the NIT, CMCT and CSCT extracted from the transport frame.

Referring to FIG. 11 (11-1), the NIT indicates that a center frequency of a broadcast frequency having a frequency point number set to '20' is 530 MHz.

Referring to FIG. 11 (11-2), the CMCT indicates that a service ID '601' and a service ID '602' correspond to the broadcast frequency having the frequency point number set to '20'.

Referring to FIG. 11 (11-3), the CSCT indicates that a service ID '601' and a service ID '602' correspond to the broadcast frequency having the frequency point number set to '20' as well.

Therefore, if both of the NIT and the CMCT or both of the NIT and the CSCT are used together, the controller 180 is able to configure such a service ID table as shown in FIG. 11 (11-4). In the service ID table, each service ID and corresponding broadcast frequency information are summarized.

Hence, the controller 180 can control the minimum broadcast service identity information for receiving and playing the broadcast service provided by the broadcasting network to be displayed on the display screen 400 using the above-configured service ID table.

Yet, the minimum broadcast service identity information does not contain the price information (e.g., information indicating whether a corresponding service is free or charged for) on each broadcast service provided by the broadcasting network. The broadcast service identity information does not contain the information indicating whether each broadcast service provided by the broadcasting network can be currently received and played back by the mobile terminal 100 due to a pay service for example. Therefore, the minimum broadcast service identity information can be understood as a simplified type of the broadcast service guide.

When the broadcast service identity information is displayed in the mobile terminal 100, the terminal user selects one broadcast service of the broadcast service identity information. If the selected broadcast service is a pay-free service, it is correctly received so that a corresponding broadcast image can be displayed. However, if the selected broadcast service is a pay service, it may not be receivable.

In order to prevent such inconvenience, before the broadcast service identity information is displayed or the terminal user selects one broadcast service after displaying the broadcast service identity information, the controller 180 is able to try an entry to each broadcast service of the broadcast service identity information. Afterwards, referring to FIG. 12 (12-2) for example, selection icons 431 for receivable and playable broadcast services 601, 602 and 603 are activated only. Hence, the display screen 400 can be configured to enable only the receivable and playable broadcast services to be selectable.

In the above description so far, the broadcast control information according to the MBBMS broadcasting specification is described. In the following description, the broadcast control information according to the DVB-H broadcasting specification is explained.

First of all, the broadcast control information according to the DVB-H broadcasting specification can include IP/MAC information (e.g., INT (IP/MAC notification table)).

The INT is explained in detail with reference to FIG. 13 as follows.

Referring to FIG. 13, the INT, which is to provide information on a location of a broadcast stream within a DVB network, may provide IP address information of the broadcast stream and information on a corresponding broadcast service ID (identifier).

Figure 14:
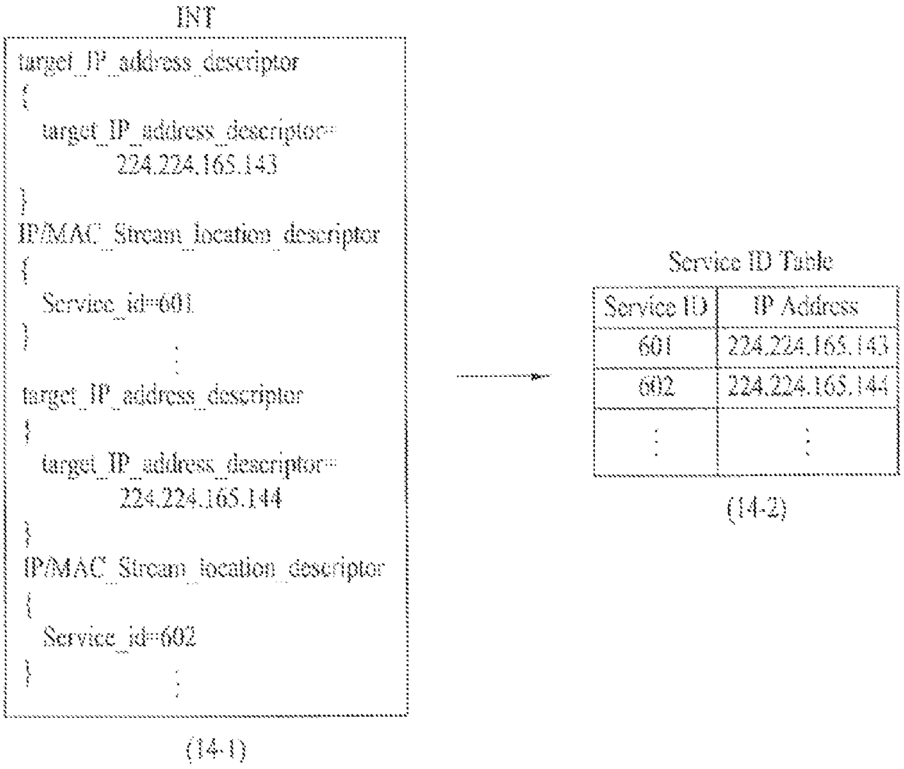

Hence, if the INT is used, it is able to obtain minimum broadcast service identity information for receiving and playing a broadcast service provided by the broadcasting network. This is further explained with reference to FIG. 14. FIG. 14 exemplarily shows the INT extracted from the transport frame.

Referring to FIG. 14 (14-1), the INT indicates that a corresponding service ID is 601 if a target IP address is 224.224.165.143. And, the INT indicates that a corresponding service ID is 602 if a target IP address is 224.224.165.144.

Hence, if the INT is used, the controller 180 is able to configure such a service ID table as shown in FIG. 14 (14-2). In the service ID table, each service ID and a corresponding broadcast IP address information are summarized.

Using the above-configured service ID table, referring to FIG. 12 (12-1) or FIG. 12 (12-2), the controller 180 can control minimum broadcast service identity information for receiving and playing a broadcast service provided by the broadcasting network to be displayed on the display screen 400.

In the above description, the broadcast service identity information is obtained from the broadcast control information of the transport frame and is then displayed on the display screen 400 to enable a terminal user to select broadcast services included in the broadcast service identity information. Yet, all broadcast services included in the broadcast service identity information are not mandatory to be displayed on the display screen. This is explained in detail with reference to FIG. 15 as follows.

Referring to FIG. 15, according to the MBBMS broadcasting specification, a type of a service ID is defined.

In particular, it is pre-defined that a service ID for such an A/V service as a TV broadcast or such an audio-only service as a radio broadcast should be a first type having a value ranging from 0x0200 to 0x3FFF. And, it is pre-defined that a service ID for a data service, a VOD service, a stock service or the like should be a second type having a value ranging from 0x4000 to 0x7FFF.

Hence, the controller 180 is able to sort broadcast services having a service ID of a first type from all broadcast services of the broadcast service identity information, and to control the display screen 400 to enable a terminal user to select a specific broadcast service among the sorted broadcast services. On the display screen 400, broadcast services having service IDs of the first type can be displayed only. Alternatively, the broadcast services having the service IDs of the first type and the broadcast services having the service IDs of the second type can be displayed in a manner of being discriminated from each other into separate lists, respectively. If necessary, the broadcast services having the service IDs of the second type can be displayed on the display screen 400 only.

In the above description, if the mobile terminal 100 is unable to receive the broadcast service guide, the minimum broadcast service identity information necessary to receive and play a broadcast provided by the broadcasting network is obtained from the broadcast control information of the transport frame. Yet, while one broadcast service is being received and played according to the broadcast service identity information, it may happen that the broadcast service guide becomes receivable. In this case, a process for receiving the broadcast service guide is explained in detail with reference to FIG. 16 as follows.

Referring to FIG. 16 (16-1), one broadcast service is selected, received and played by the mobile terminal 100 according to the broadcast service identity information. And, a broadcast image according to the selected broadcast service can be displayed on the display screen 400.

In the course of displaying the broadcast image, the controller 180 periodically checks whether the broadcast service guide can be received via the broadcast receiving module 111 or the mobile communication module 112.

As a result of the check, if the broadcast service guide can be received, the controller 180 automatically receives the broadcast service guide. And, the controller 180 updates the broadcast service identity information into the received broadcast service guide to enable the received broadcast service guide to be used instead of the broadcast service identity information in the future.

Alternatively, referring to FIG. 16 (16-2), the controller 180 controls a guide window 440, which indicates that the broadcast service guide can be received, to be displayed.

If a terminal user selects to receive the broadcast service guide via the guide window 440, the controller 180 receives the broadcast service guide. As mentioned in the foregoing description, the controller 180 updates the broadcast service identity information into the received broadcast service guide to enable the received broadcast service guide to be used instead of the broadcast service identity information in the future.

If necessary, referring to FIG. 16 (16-3), the controller 180 is able to display the received broadcast service guide on the display screen 400.

Accordingly, the present invention provides the following effects and/or advantages.

First of all, according to at least one of embodiments of the present invention, when a mobile terminal attempts a broadcast reception in a broadcasting network according to a specific broadcasting specification, even if it is unable to receive a broadcast service guide about the broadcasting network, the present invention provides a terminal user with information on broadcast services provided by the broadcasting network and enables the provided broadcast services to be received and displayed by being selected by a terminal user.

It will be apparent to those skilled in the art that various modifications and variations can be specified into other form (s) without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:

a broadcast receiver configured to receive a transport stream from a broadcasting network;

a display configured to display a broadcast image; and a controller configured to access a mobile communication network and, when a broadcast service guide is receivable via the broadcasting network or the mobile communication network, receive and display the broadcast service guide, wherein the controller is further configured to, when the broadcast service guide is not receivable, extract broadcast control information from the transport stream, obtain broadcast service identity information on a broadcast service provided by the broadcasting network from the extracted broadcast control information, display the obtained broadcast service identity information, wherein the broadcast control information comprises network configuration information of the broadcasting network and multiplex configuration information, wherein the controller receives information on all broadcast frequencies provided by the broadcasting network from the network configuration information and controls the broadcast service identity information provided by each of the broadcast frequencies to be obtained from the multiplex configuration information, wherein the broadcasting network follows MBBMS (mobile broadcast business management system) broadcasting specification, wherein the network configuration information comprises NIT (network information table), and wherein the multiplex configuration information comprises CMCT (continual service multiplex configuration table).

2. The mobile terminal of claim 1, wherein when the broadcast service guide is not receivable, the controller scans a prescribed broadcast frequency band of the broadcasting network until being tuned to a random broadcast frequency and then extracts the broadcast control information from the transport stream of the tuned broadcast frequency.

3. The mobile terminal of claim 1, wherein the controller controls reception and playback possibility information on each broadcast service to be displayed together with the broadcast service identity information.

4. The mobile terminal of claim 1, wherein after the broadcast service identity information has been displayed, when the broadcast service guide is receivable, the controller controls the broadcast service identity information to be updated into the received broadcast service guide.

5. The mobile terminal of claim 1, wherein after the broadcast service identity information has been displayed, when the broadcast service guide is receivable from the mobile communication network, the controller displays an alarm indicating that the broadcast service guide is displayable and then controls the broadcast service guide to be displayed according to a selection made by a user.

6. The mobile terminal of claim 3, wherein before the broadcast service identity information is displayed, the controller attempts to sequentially receive all broadcast services provided by the broadcasting network and then controls reception and playback possibility information on each of the broadcast services to be displayed together with the broadcast service identity information.

7. A method of controlling a mobile terminal, the method comprising:

receiving a transport stream from a broadcasting network;

accessing a mobile communication network or the broadcasting network to receive a broadcast service guide;

when the broadcast service guide is receivable, receiving and displaying the broadcast service guide; and when the broadcast service guide is not receivable, extracting broadcast control information from the transport stream, obtaining broadcast service identity information on a broadcast service provided by the broadcasting network from the extracted broadcast control information, and then displaying the obtained broadcast service identity information, wherein the broadcast control information comprises network configuration information of the broadcasting network and multiplex configuration information, wherein the method further comprises:

receiving information on all broadcast frequencies provided by the broadcasting network from the network configuration information; and obtaining the broadcast service identity information provided by each of the broadcast frequencies from the multiplex configuration information, wherein the broadcasting network follows MBBMS (mobile broadcast business management system) broadcasting specification, wherein the network configuration information comprises NIT (network information table), and wherein the multiplex configuration information comprises CMCT (continual service multiplex configuration table).

8. A mobile terminal comprising:

a broadcast receiver configured to receive a transport stream from a broadcasting network;

a display configured to display a broadcast image; and a controller configured to access a mobile communication network and, when a broadcast service guide is receivable via the broadcasting network or the mobile communication network, receive and display the broadcast service guide, wherein the controller is further configured to, when the broadcast service guide is not receivable, extract broadcast control information from the transport stream, obtain broadcast service identity information on a broadcast service provided by the broadcasting network from the extracted broadcast control information, display the obtained broadcast service identity information, wherein the broadcast control information comprises network configuration information of the broadcasting network and carrier frequency information, wherein the controller receives information on all broadcast frequencies provided by the broadcasting network from the network configuration information and controls the broadcast service identity information provided by each of the broadcast frequencies to be obtained from the carrier frequency information, wherein the broadcasting network follows MBBMS (mobile broadcast business management system) broadcasting specification, wherein the network configuration information comprises NIT (network information table), and wherein the carrier frequency information comprises CSCT (continual service configuration table).

* * * * *